(12) United States Patent
Harmsen et al.

(10) Patent No.: US 8,587,910 B2
(45) Date of Patent: Nov. 19, 2013

(54) FUNCTION MODULE AND COUPLING MODULE FOR A SWITCH DEVICE CONTROL AND SYSTEM FOR SWITCH DEVICE CONTROL

(75) Inventors: Peter Harmsen, Schwarzenfeld (DE); Rainer Keil, Nürnberg (DE); Helmut Kraus, Kümmersbruck (DE)

(73) Assignee: Siemens AG, Munich (DE)

( * ) Notice: Subject to any disclaimer, the term of this patent is extended or adjusted under 35 U.S.C. 154(b) by 377 days.

(21) Appl. No.: 13/119,227

(22) PCT Filed: Sep. 18, 2008

(86) PCT No.: PCT/EP2008/007831
§ 371 (c)(1),
(2), (4) Date: Mar. 16, 2011

(87) PCT Pub. No.: WO2010/031414
PCT Pub. Date: Mar. 25, 2010

(65) Prior Publication Data
US 2011/0166675 A1   Jul. 7, 2011

(51) Int. Cl.
*H02H 3/00* (2006.01)
*H02H 7/00* (2006.01)
*B23K 11/24* (2006.01)
*H01R 33/96* (2006.01)

(52) U.S. Cl.
USPC ............... 361/64; 361/62; 361/71; 307/112; 307/113; 200/51 R; 200/51.09

(58) Field of Classification Search
USPC ............ 361/62, 64, 71; 307/11–12, 112–113; 200/51.09, 51 R; 327/1, 597; 363/116–122
See application file for complete search history.

(56) References Cited

U.S. PATENT DOCUMENTS 4,777,590 A * 10/1988 Durkos et al. ................... 712/43
5,770,928 A *  6/1998 Chansky et al. ............. 315/362
5,771,230 A *  6/1998 Stoeckl et al. ........... 370/395.31
(Continued)

FOREIGN PATENT DOCUMENTS

CN    1589516 A    3/2005
CN    1592994 A    3/2005
(Continued)

OTHER PUBLICATIONS

International Search Report.

*Primary Examiner* — Ramesh Patel
(74) *Attorney, Agent, or Firm* — Harness, Dickey & Pierce, P.L.C.

(57) ABSTRACT

A functional module for a switch device control is disclosed. In at least one embodiment, the functional module includes—a communication unit having a communication interface for communicating with at least one further functional module and/or at least one coupling module,—a control unit connected to the communication unit and designed to receive signals transmitted from the at least one further functional module and/or the at least one coupling module to the communication unit and to transmit switch commands via the communication unit to the at least one further functional module and/or the at least one coupling module,—a first control current interface for the electric connection to a first switch device or an external energy supply unit, and—a second control current interface for supplying control current to the at least one further functional module and/or the at least one coupling module.

22 Claims, 4 Drawing Sheets

(56) References Cited

U.S. PATENT DOCUMENTS

| | | | |
|---|---|---|---|
| 5,978,193 A * | 11/1999 | Kaaden | 361/64 |
| 6,107,696 A * | 8/2000 | Peter et al. | 307/31 |
| 6,418,481 B1 * | 7/2002 | Mancusi et al. | 709/250 |
| 6,650,649 B1 * | 11/2003 | Muhammad et al. | 370/402 |
| 6,721,419 B1 * | 4/2004 | Stell et al. | 379/413.02 |
| 7,023,305 B2 | 4/2006 | Cuny et al. | |
| 7,231,280 B2 | 6/2007 | Costa | |
| 8,229,602 B2 * | 7/2012 | Montgomery et al. | 700/295 |
| 8,301,314 B2 * | 10/2012 | Deaver et al. | 700/298 |
| 8,352,091 B2 * | 1/2013 | Haugh | 700/286 |
| 8,359,248 B2 * | 1/2013 | Witter et al. | 705/28 |
| 2005/0087430 A1 | 4/2005 | Ette et al. | |
| 2005/0270164 A1 * | 12/2005 | McDonald et al. | 340/638 |
| 2006/0052905 A1 * | 3/2006 | Pfingsten et al. | 700/286 |
| 2006/0125421 A1 * | 6/2006 | Costa | 315/294 |
| 2009/0067110 A1 * | 3/2009 | Beyer et al. | 361/191 |
| 2009/0138749 A1 * | 5/2009 | Moll et al. | 713/503 |
| 2011/0291493 A1 * | 12/2011 | Beyer et al. | 307/113 |

FOREIGN PATENT DOCUMENTS

| | | |
|---|---|---|
| DE | 4401093 A1 | 7/1995 |
| FR | 2803416 A1 | 7/2001 |
| WO | WO-2006065917 A1 | 6/2006 |

* cited by examiner

BACKGROUND ART

BACKGROUND ART

FUNCTION MODULE AND COUPLING MODULE FOR A SWITCH DEVICE CONTROL AND SYSTEM FOR SWITCH DEVICE CONTROL

PRIORITY STATEMENT

This application is the national phase under 35 U.S.C. §371 of PCT International Application No. PCT/EP2008/007831 which has an International filing date of Sep. 18, 2008, which designated the United States of America, the entire contents of each of which are hereby incorporated herein by reference.

FIELD

At least one embodiment of the invention generally relates to a function module and/or a coupling module for switching device control. In addition, at least one embodiment of the invention generally relates to a system for switching device control.

BACKGROUND

In electrical installations with switchable load feeders, there is often the need to switch the switching members, such as contactors, in dependence on one another. These sometimes complex circuits often require logic operations, interrogation of the switching states, driving of the switching devices and interlocks and are therefore often associated with a great deal of wiring complexity in the control current circuit. In addition, additional devices such as timing relays or auxiliary switches, are required which often need to be wired to each individual switching device.

Complex circuits are therefore constructed by wiring of the control current circuits in which the switching devices are also wired to the additional components, such as timing relays and auxiliary switches, which can drive up the total costs of the installation and complicate the design of the complex circuits. Depending on the fitter, the switching devices, in particular contactors, are wired differently. As a result of the replacement of switching devices, in particular with ones from different manufacturers, it is often no longer possible for others to understand the wiring, with the result that increased complexity is involved in getting a look at the wiring of the individual switching devices and the additional devices in this case.

SUMMARY

At least one embodiment of the invention reduces the wiring complexity for complex circuits, to centralize the control of the respectively used switching devices and to simplify and standardize the additional devices connected to the switching devices in terms of their configuration.

At least one embodiment of the invention is directed to a function module, a coupling module and/or a system for switching device control. Further features and details of the invention are given in the dependent claims, the description and the drawings. In this case, features and details which are described in the context of the function module according to at least one embodiment of the invention naturally also apply in the context of the coupling module according to at least one embodiment of the invention and the system for switching device control according to at least one embodiment of the invention, and vice versa, with the result that, with respect to the disclosure, reference is always made reciprocally to the individual aspects of at least one embodiment of the invention.

The dependent patent claims describe advantageous aspects of embodiments of the invention.

In accordance with the first aspect of at least one embodiment of the invention, a function module is disclosed for switching device control, wherein the function module has a communication unit with a communication interface for communicating with at least one further function module and/or at least one coupling module, a control unit, which is connected to the communication unit and is designed to receive signals transmitted by the at least one further function module and/or the at least one coupling module to the communication unit and to transmit switching commands via the communication unit to the at least one further function module and/or the at least one coupling module.

In at least one embodiment, a first control current interface is included for electrical connection to a first switching device or an external power supply unit, and a second control current interface is included for supplying control current to the at least one further function module and/or the at least one coupling module.

Such a function module for switching device control reduces the wiring complexity for complex circuits, such as a star-delta circuit. In addition, it centralizes the control of the respectively used switching devices of the complex circuits and makes it possible to simplify or standardize the additional devices connected to the switching devices, the so-called coupling modules.

As a result of the fact that the function module has a communication interface for communicating with at least one further function module and/or at least one coupling module, a first control current interface for electrical connection to a first switching device or an external power supply unit and a second control current interface for supplying control current to at least one further function module and/or at least one coupling module, the control current supply and therefore the reading of the switching state and the control of the first switching device and/or the further switching devices, which are connected to the further function modules and/or coupling modules, can be simplified. The function module contains all of the elements which are required for driving the first switching device and the further function modules or the coupling modules and therefore the further switching devices. Owing to this versatility of the function module, the further coupling modules can be formed in a much simplified manner and the wiring complexity between the function module, the coupling modules and the switching devices is reduced.

By virtue of such a design, the function module can control, for example, the sequence of a star-delta circuit, having three contactors as switching devices. In this case, the function module is positioned at the first contactor, the so-called line contactor.

The function module draws the control current via the first control current interface from the line contactor or an external power supply unit. The function module supplies the coupling modules, which are arranged at the further contactors, i.e. the star contactor and the delta contactor, with control current via the second control current interface. The total supply of control current to the electrical circuit, in this case the star-delta circuit, takes place via the function module. This is enabled by the second control current interface of the function module.

Complex control current wiring of the further coupling modules from the line contactor or the external power supply unit is not required. In this case, the function module supplies the control current to a further coupling module via a first coupling module. The complex circuit may also be a starter for a motor with a plurality of speeds, a Dahlander circuit, a reversing circuit, etc.

The communication unit receives signals (AE) from the at least one further function module and/or the at least one further coupling module via the communication interface. It is conceivable for further function modules to be used for operation of a complex circuit. Advantageously, however, only one function module is required. In general, coupling modules with a simple design can continue to be used for producing the connection to the further switching devices. In addition, the function module transmits switching commands (SK) to the at least one further function module and/or the at least one further coupling module for controlling said module or the switching devices connected thereto, for example the star contactor and the delta contactor in a star-delta circuit.

Owing to the communication interface and the communication unit as well as the second control current interface, the function module is capable of controlling the sequence of a complex circuit such as a star-delta circuit, of a Dahlander circuit, a reversing circuit, etc. In this case, the function module can control, for example, the interlocking, the run-up time and the switchover phase of all of the switching devices which are connected to the function module or to the further function modules or to the coupling modules. The wiring of an auxiliary switch or a time-delay switching relay for each individual switching device in a complex circuit is no longer required as a result of the use of such a function module.

Preferred is a function module in which the second control current interface is integrated in the communication interface of the communication unit or the communication interface of the communication unit is integrated in the second control current interface. This means that a single interface is responsible for the communication and the supply of control current. One interface can have two separate contact points. In addition, the communication between the function module and a further function module and/or a coupling module can take place via the control current circuit. That is to say that signals can be received from the function module via the control current circuit and switching commands can be transmitted to the further modules. An interface with such a design can make it possible to supply control current to another module and at the same time to communicate with another module. That is to say that the data interchange between the modules can also take place at the same time via the control current.

An example embodiment of the function module envisages that the function module is connected electrically and/or mechanically to the first switching device in order to detect the switching state of the first switching device via a sensor element associated with the control unit and in order to transmit switching commands to the first switching device. Such a configuration of the function module is required when the supply of control current to the function module is not performed by the first switching device, but by an external power supply unit. If the control current supply to the function module is carried out via the first switching device, for example the line contactor of a star-delta circuit, the switching state of the first switching device can be transmitted directly from the line contactor to the function module via the retransmitted control current. If the function module is supplied with control current by an external power supply unit, the switching state of the first switching device needs to be detected via a sensor element associated with the control unit. By virtue of the electrical and/or mechanical coupling between the function module and the first switching device, the control device can detect a movement of the plunger of the first switching device and pass on the detected information to the control unit of the function module. The sensor element is preferably integrated in the function module. In this case, the sensor element detects, for example, the position or a movement of a plunger protruding into the function module of an actuating element of the first switching device. Inductive, capacitive or optical sensor elements can also be used for detecting the movement of the plunger.

In addition, a function module is preferred in which the control unit of the function module is designed to use the measured variables detected by the sensor element to determine the switching state of the first switching device and/or the switching state of the at least one second switching device, which is connected electrically to the at least one further function module and/or the at least one coupling module, on the basis of the received signals (AE), the at least one further function module and/or the at least one coupling module having a sensor element for detecting the switching state of the at least one second switching device. In this case, each further function module or each coupling module preferably has a sensor element in order to detect the switching state of the switching devices, which are connected mechanically and/or electrically to the respective further function module or to the at least one coupling module. Preferably, a plunger of an actuating element of the respectively connected switching device, for example a star contactor and a delta contactor of a star-delta circuit, protrudes into each further function module or into each coupling module. The respective sensor elements of the function modules and the coupling modules detect the switching state of the respective switching devices and transmit these switching states to the communication unit of the function module. The function module can monitor the switching state of the entire circuit on the basis of the information relating to the switching states of the individual switching devices and centrally control the sequence of the circuit of the switching devices. If the control unit of the function module establishes that there is a fault, said control unit can interrupt the current flow. The control unit of the function module transmits the switching commands to the further function modules or the further coupling modules via the communication unit, with the result that said further function modules or further coupling modules transmit the switching commands via the electrical and/or mechanical connections to the respective connected switching device and thus control the switching state of the individual switching devices.

The function module determines the switching states of the respective switching devices on the basis of the signals received by the control unit from the other function modules or the coupling modules and uses this information for controlling the circuit.

Further preferred is a function module in which the control unit of the function module is designed to actuate a first electrical circuit via a switching command in order to bring about a change in the switching state of the first switching device and to actuate at least one second electrical circuit via at least one switching command in order to bring about a change in the switching state of the at least one second switching device.

If the control unit of the function module has determined all of the switching states of all of the switching devices, it can change the switching states of the switching devices in a targeted manner. For this purpose, the function module uses electrical circuits which are provided in the function module itself or in the connected further function modules or the coupling modules. That is to say that each function module and each coupling module preferably has an electrical circuit which can be driven by the control unit of the function module. As a result, the switching devices can be driven in centralized fashion by one function module and can be changed corresponding to the switching states of each switching device.

In addition, a function module is preferred in which the function module or the control unit of the function module has a time-delay switching device in order to transmit a switching command to the first electrical circuit and therefore to the first switching device and/or in order to transmit a switching command to the at least one second electrical circuit and therefore to the at least one second switching device depending on the detected switching states and/or at least one input control signal of the first switching device to the at least one further function module and/or the at least one coupling module. The time-delay switching device makes it possible to drive the respective switching devices in temporally accurate fashion. That is to say that the time-delay switching device makes it possible to adhere to a schedule, in accordance with which the respective switching devices are switched on or off or interlocked. For example, in the case or a star-delta circuit, the star contactor and the delta contactor are not switched on at the same time. Before the star contactor is switched on, the delta contactor first needs to be switched off. The control unit of the function module can drive the respective switching devices temporally in succession or, if required, also simultaneously via the time-delay switching device.

Advantageously, the time-delay switching device of the function module is connected to a preprogrammed or preprogrammable circuit diagram in a memory module of the function module or the control unit of the function module in order to provide the control apparatus with switching states of the individual switching devices which are predetermined on the basis of the circuit diagram. The control unit of the function module transmits the switching commands predetermined in the circuit diagram in a temporally offset fashion to the respective connected further function modules or coupling modules.

These, in turn, bring about a change in the switching device state via the electrical circuits thereof. In this case, the time-delay switching device can use predetermined circuit diagrams. However, it is also conceivable for it to be possible for a circuit diagram to be established or altered via an input unit associated with the function module. Advantageously, the memory module has a so-called look-up table, which contains the successive switching states of individual switching devices.

Each further function module or each coupling module is coupled electrically and/or mechanically to a respective switching device. Particularly preferred is a function module which is designed to control the switching state of the first switching device, which is associated with the function module, and/or of the at least one further function module and/or of the switching device associated with the at least one coupling module, via the respective coil terminals thereof. That is to say that, in order to retransmit the switching commands, the respective coil terminals of the switching devices can be used. In order to detect the switching states of the switching devices, i.e. the position of the plunger of the switching devices, it is also possible to use electronically, inductively, capacitively or optically measuring sensor elements, in additional to mechanically actuable sensor elements.

A further preferred embodiment of the function module provides for the function module to be fastened detachably on the associated switching device or integrated in the associated switching device so as to produce the electrical and/or mechanical connection. In particular, the function module can be snapped and/or latched onto the associated switching device. That is to say that the function module is advantageously fastened on a switching device in a force-fitting and form-fitting manner. For this purpose, various fastening elements can be used. For example, the connection can be produced by snap-action or latching elements, for example. In addition, plug-type elements are conceivable which are inserted into corresponding receptacles of the respective other component and are held therein in a force-fitting manner.

When the mechanical connection between the module and the switching device is produced, the electrical connections are also produced. For this purpose, plug-type connections or spring contacts can be used, for example.

In accordance with the second aspect of at least one embodiment of the invention, a coupling element for switching device control is disclosed, wherein the coupling module has a communication unit and a control unit, which is connected to the communication unit, a sensor element for detecting the switching state of a switching device associated with the coupling module being associated with the control unit, in which the communication unit has a first communication interface for communicating with at least one function module and a second communication interface for communicating with at least one further coupling module, in which the control unit is designed to transmit the detected switching state of the switching device to the function module or to the at least one further coupling module via the communication unit, with an electrical circuit being associated with the control unit, wherein a switching command received via the communication unit can be used to actuate the electrical circuit in order to bring about a change in the switching state of the switching device, and wherein the coupling module has two control current interfaces.

The coupling module has a communication unit with two communication interfaces. The first communication interface is used for producing a communication link with at least one function module and the second communication interface is used for producing a communication link with at least one further coupling module. The communication unit is connected to a control unit, which makes it possible to process data. That is to say that the control unit is designed to transmit the detected switching state of the switching device to the function module or to the at least one further coupling module via the communication unit.

In order to detect the switching state of the associated switching device, a sensor element is associated with the control unit, which can be mechanical, inductive, capacitive, electrical or optical. In this case, the sensor element detects the switching state for example on the basis of the position of the plunger of an actuating element of the associated switching device. In addition, an electrical circuit is associated with the control unit. The control unit retransmits switching commands received via the communication unit to the electrical circuit for actuation thereof. By virtue of the actuation of the electrical circuit, a change in the switching state of the switching device is brought about.

Such a coupling module for switching device control likewise reduces the wiring complexity for complex circuits. Since the driving of the respective switching devices used of the complex circuits is performed by a function module, the coupling modules can have a relatively simple design. The control unit of the coupling module merely retransmits signals and switching commands. The coupling module or the control unit of the coupling module does not require a dedicated time detection unit or a memory module, in which a circuit diagram is stored, in order to drive the connected switching device. Such a coupling module is also used for retransmitting the control current from the function module to a further coupling module or from a coupling module to a further coupling module. That is to say that the coupling modules are designed in such a way that they can be connected in series and are designed both for retransmitting control current and for retransmitting signals or switching commands. The retransmission of the control current takes place via the two control current interfaces of the coupling module. In this case, provision is preferably made for a control current interface to be integrated in a communication interface or for a communication interface to be integrated in a control current interface. The coupling modules are in this case designed in such a way that any coupling module can be used for any switching device. That is to say that the coupling module is versatile as a result of the simple design.

The control unit does not automatically control the switching device state of an associated switching device, but is merely used for retransmitting control commands or measured variables detected by the sensor element.

A further example embodiment of the coupling module provides for the coupling module to be fastened detachably on the associated switching device or integrated in the associated switching device so as to produce the electrical and/or mechanical connection. In particular, the coupling module can be snapped and/or latched onto the associated switching device. That is to say that the coupling module is advantageously fastened on a switching device in a force-fitting and form-fitting manner. For this purpose, various fastening elements can be used. Thus, for example, the connection can be produced by snap-action or latching elements. In addition, plug-type elements are also conceivable, which are inserted into corresponding receptacles in the respective other component and are held therein in a force-fitting manner. Thus, for example, cage tension spring connections are conceivable.

Further disclosed is an example embodiment of a function module or a coupling module which has a device for making contact with the main current paths of the associated switching device, the device for making contact with the main current paths being coupled to the control unit of the function module and the coupling module, respectively, with the result that the state of the associated switching device can be detected via a sensor element associated with the respective control unit, and the detected state of the associated switching device can be used to control a further switching device. For example, the voltage, the phase angle or the phase sequence of a switching device can be detected via the device for making contact with the main current paths of the switching device. The sensor element, via which the state of the associated switching device can be detected, is advantageously integrated in the function module or in the coupling module.

The sensor element is provided in addition to the sensor element which is used for detecting the switching state.

In accordance with a third aspect of at least one embodiment of the invention, a system for switching device control is disclosed, wherein the system has at least one function module in accordance with the first aspect of at least one embodiment of the invention and at least one coupling module in accordance with the second aspect of at least one embodiment of the invention, which modules are connected to one another via communication units with associated communication interfaces and via control current interfaces for retransmitting a control current.

The function module is associated with a first switching device or is connected electrically and/or mechanically thereto, and the at least one coupling module is associated with a further switching device or is connected electrically and/or mechanically thereto.

Such a system makes it possible to markedly reduce the wiring complexity of a complex circuit which has a plurality of switching devices. By virtue of the fact that the entire driving of all of the switching devices takes place via a single function module, the coupling modules can have a simple design. The supply of control current to such a system is performed via the function module. That is to say that the function module retransmits the control current to a coupling module via a control current interface. In turn, this coupling module retransmits the control current to a further coupling module. That is to say that the function module and the further coupling modules are connected in series with one another. As a result, the wiring complexity is reduced and the form of the wiring is predetermined. In addition, the communication likewise takes place via the series circuit of modules. Starting from the function module, a switching command is transmitted to a coupling module. If the switching command is not intended for the first coupling module in the series circuit, said coupling module retransmits the switching command until the relevant coupling module is reached.

In this way, there is no need for the otherwise conventional external control current wiring for each switching device and the wiring between each switching device and a time detection device or a timing relay and to an auxiliary switch.

In at least one example embodiment is a system for switching device control in which the at least one function module or the at least one coupling module are connected to one another by way of a connecting cable, in particular a flat ribbon cable, and/or a jumper plug. This can be used to connect the function module to a further function module or to a coupling module in a simple manner. This applies to the connection of the coupling modules to one another. The connecting cables or the jumper plugs are simply plugged into the correspondingly provided interfaces, i.e. the communication interfaces and the control current interfaces, with the result that both the control current and data can be transmitted over said interfaces. The nature of the connection of the modules to one another is standardized and predetermined by the interfaces of the function modules and the coupling modules.

Such a function module and such a coupling module for switching device control and such a system for switching device control make it possible to fit the modules and the system quickly and securely using a complex circuit which has a plurality of switching devices. Owing to the simplicity of the modules and therefore the system for switching device control, the modules can also be fitted by untrained personnel. Since the driving and the supply of power to the coupling modules or the further function modules and therefore to the respective switching devices takes place via the connecting cables or the jumper plugs, no further control connections to the switching devices are required. The sequence for the wiring, i.e. the main current circuits and the control current circuits, is as desired on the basis of the nature of the design of the system. By virtue of a suitable internal circuit of the coupling modules, said coupling modules can be identical for star driving and delta driving, as a result of which the variance of the coupling modules can be reduced. The coupling modules and the function module can be used for different switching device sizes, in particular contactor sizes, as a result of a suitable design. Owing to this type of design of the function module, the coupling module and therefore the system for switching device control, a wide application in contactor control systems is possible.

If a system for switching device control has at least one function module and at least one coupling module, which are connected to one another via communication terminals, it is possible to reduce the wiring complexity for the control wiring.

Additionally disclosed in at least one embodiment is a switching system for switching polyphase circuits with a number of switching devices which are or can be connected to electrical loads, the switching system having a system for switching device control in accordance with the third aspect of at least one embodiment of the invention which is or can be integrated or is or can be coupled to the switching devices. A switching system for switching polyphase circuits with a number of switching devices which are or can be connected to electrical loads if it has a system for switching device control which is or can be integrated or is or can be coupled to the switching devices, can be wired more quickly than was previously the case.

If the function module has at least one time-delay switching device, and if the control apparatus is designed to delay the transmission of a switching command or the action on an electrical circuit for changing the switching state of the switching device until the time-delay switching device has established that a predetermined time has elapsed, the temporal control can be realized in a simple manner. The additional enquiry and control wiring which is required for applications with one or more timing relays can be dispensed with.

If the function module has a preprogrammed or preprogrammable memory module, which is designed to provide the control apparatus with successive switching states of individual switching devices, different switching operations can be performed with one function module type. If the memory module has a look-up table, which contains the successive switching states of individual switching devices, the management complexity is reduced and the programming of the function module can be realized in a simpler manner.

Advantageously, the function module can be snapped onto the associated switching device. Then, this can be marketed separately as an add-on. However, it is also possible for the function module to be integrated in the associated switching device, which can further reduce the installation complexity involve. By virtue of the modular design of the function or coupling modules, the external control wiring and possible timing relays and the auxiliary switching elements can be dispensed with.

BRIEF DESCRIPTION OF THE DRAWINGS

Some aspects of the invention will be explained in more detail below with reference to the examples illustrated in the attached drawings, in which.

DETAILED DESCRIPTION OF THE EXAMPLE EMBODIMENTS

Figure 1:
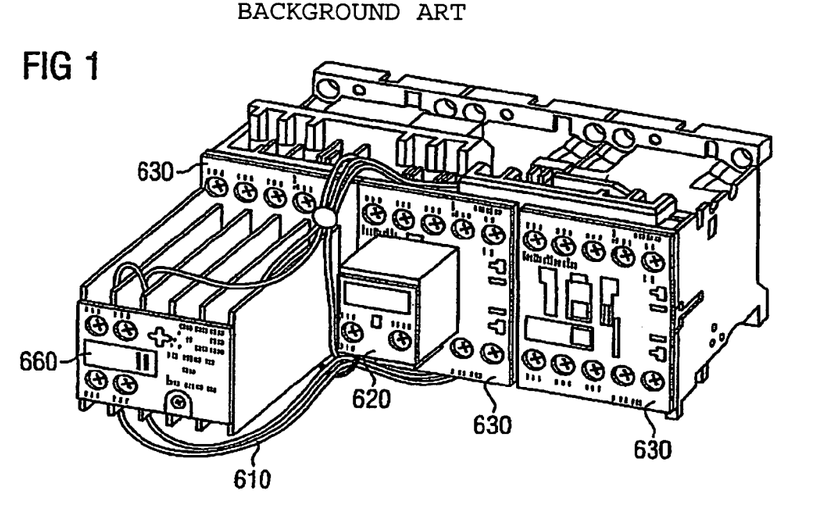
FIG. 1 shows a star-delta wiring for switching devices with a first physical size in accordance with the prior art.

FIG. 1 shows a first known star-delta wiring with three contactors 630, which are connected to one another via enquiry and control wiring 610, 615 and using an auxiliary switch 620. The temporal control for switching from the star contactor to the delta contactor is performed by the timing relay 660.

Figure 2:
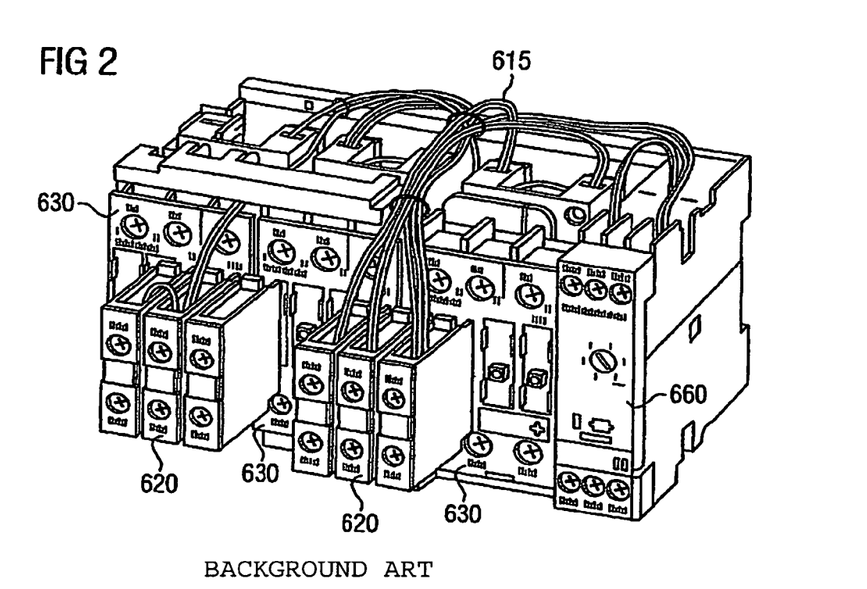
FIG. 2 shows a star-delta wiring for switching devices with a second physical size from the prior art.

FIG. 2 shows a second known star-delta wiring with three contactors 630, which require a separate timing relay 660 owing to their slightly larger physical size. In total, six auxiliary switches 620 and more cable connections 615 than in the wiring shown in FIG. 1 are required.

A concept on which an embodiment of the invention is based is the realization of the enquiry and control wiring using function modules and coupling modules which can be plugged on or integrated on switching devices with mechanical and electrical coupling to the switching device located therebeneath. The function and coupling modules are connected to one another by a suitable electrical connection.

Figure 3:
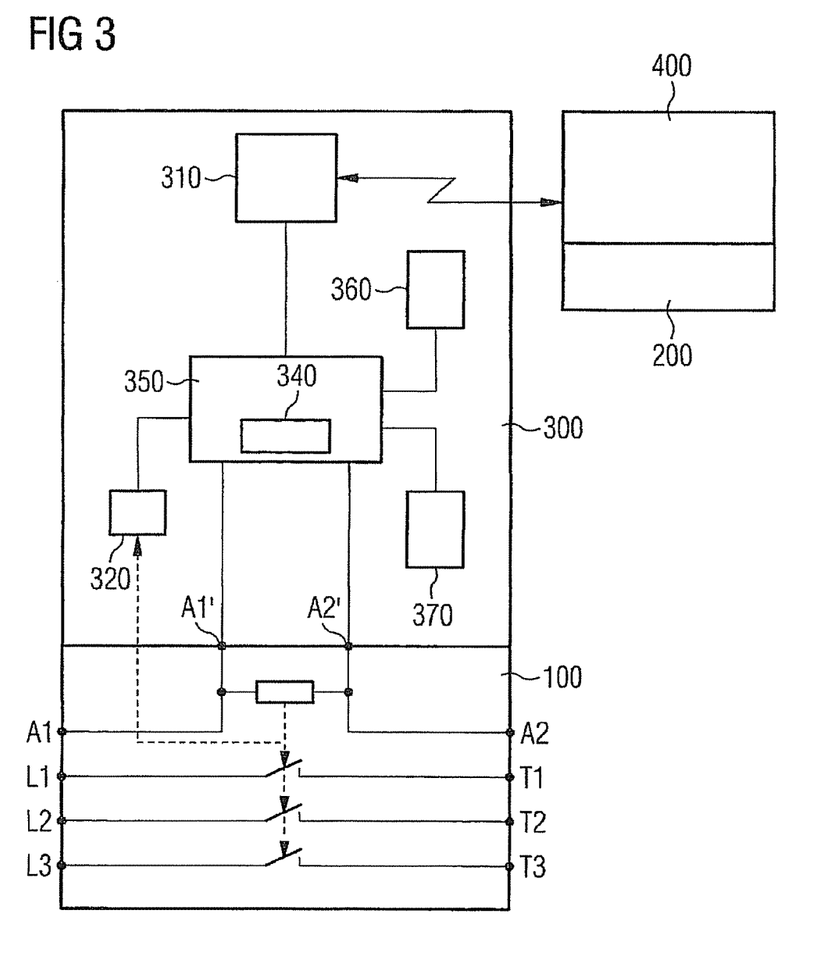
FIG. 3 shows a function module with a switching device associated with the function module.
Figure 4:
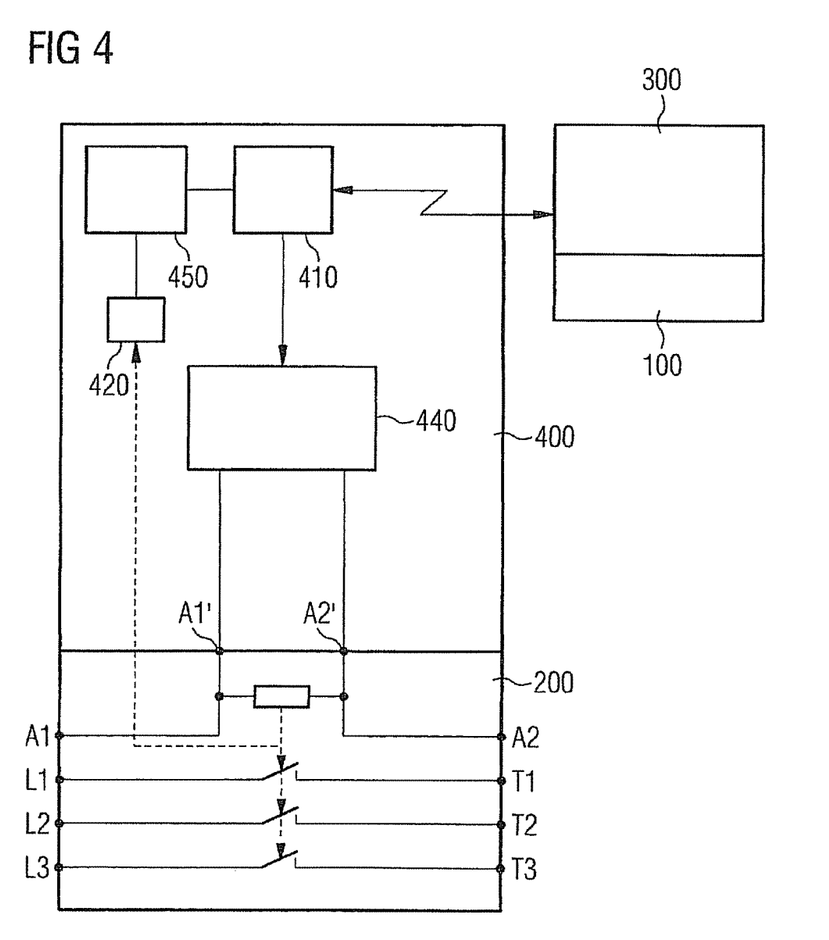
FIG. 4 shows a coupling module with a switching device associated with the coupling module.

In FIGS. 3 and 4, the design of the function modules and coupling modules is explained.

A function module 300, as illustrated in FIG. 3, contains the function logic such as time setting and interlocking and additionally the driving and enquiry of the switching state of the associated first switching device 100.

The function module 300 for the switching device control has at least one communication unit 310 with a communication interface for communicating with at least one further function module 300 or a coupling module 400.

The communication unit 310 can be implemented with wiring or in wireless fashion. The function module 300 also has at least one sensor element 320 for enquiring after the switching state of a first switching device 100 associated with the function module 300. The sensor element 320 can determine the switching state of the first switching device 100, for example by means of a mechanical tap into a plunger of an actuating element of the first switching device 100, but it is also possible to use inductive, capacitive or optical sensor elements.

In addition, the function module 300 has at lest one electrical circuit 340 for changing the switching state of the switching device 100, and a control unit 350. The electrical circuit 340 can in this case be integrated in the control unit 350 or associated therewith. In this example embodiment, the electrical circuit 340 is integrated in the control unit 350.

The control unit 350 is designed to receive switching state information from at least one further function module or at least one coupling module 400 with respect to the switching devices 200 associated therewith via the communication unit 310. In addition, the control unit 350 of the function module 300 can transmit switching commands SK to the further function modules or coupling modules 400 via the communication unit 310 or the communication interface of the communication unit 310 in order to bring about a change in the switching state of the switching device 200 associated with the at least one function module or the at least one coupling module 400.

Advantageously, the function module 300 has at least one time-delay switching device 360. The control unit 350 of the function module 300 can drive the at least one further function module or the at least one further coupling module 400 at specific times via this time-delay switching device 360. In this case, the time-delay switching device 360 preferably uses a circuit diagram for driving the switching devices 100, 200 of the complex circuit. For this purpose, the function module 300 advantageously has a memory module 370, in which the at least one circuit diagram is stored. In this case, the circuit diagram can be preprogrammed or programmable.

In order to program the circuit diagram, an input unit (not illustrated) is associated with the function module 300 or the control unit 350 of the function module 300.

The circuit diagram(s) in the memory module 370 is/are designed in such a way that the time-delay switching device 360 of the control apparatus 350 can provide successive switching states of individual switching devices 100, 200.

The memory module 370 can have a look-up table as the circuit diagram, said look-up table containing the successive switching states of individual switching devices 100, 200.

Preferably, the function module 300 can be snapped onto the associated switching device 100. However, it is also possible for the function module 300 to be integrated in the associated switching device 100.

The coupling module 400, as illustrated in FIG. 4, which is connected downstream of the function module 300, is used for driving or enquiring after the switching state of the switching device 200 associated with the coupling module 400.

The coupling module 400 for switching device control has at least one communication unit 410 with a communication interface for communicating with at least one function module or a further coupling module 400 and at lest one sensor element 420 for enquiring after the switching state of the switching device 200 associated with the coupling module 400. The communication unit 410 or the communication interface can be implemented wirelessly or using wires.

In addition, the coupling module 400 has at least one electrical circuit 440 for changing the switching state of the switching device 200 and at least one control unit 450.

The control unit 450 is designed to transmit the interrogated switching state of the switching device 200 via the communication unit 410 or via the communication interface of the communication unit 410 to the function module 300, to receive a switching command SK via the communication unit 410 or via the communication interface of the communication unit 410, and to use the switching command SK to drive the electrical circuit 440 so as to change the switching state of the switching device 200, with the result that the switching device 200 can reach a switching state which corresponds to the switching command SK.

The control unit 450 has a simple design. It retransmits the switching commands SK received from the function module 300 merely to the electrical circuit 440. The function module 300 controls the switching state of the switching device 200 connected to the coupling module 400 via the switching commands SK.

The coupling module 400, as is also the case for the function module 300, can be snapped onto the switching device 100, 200 associated therewith. It is also possible here for the coupling module 400 to be integrated in the switching device 430 associated therewith.

For control current supply, the function module 300 has two control current interfaces. The first control current interface is designed to supply a control current to the function module 300. In this case, the control current can be passed from the first switching device 100 or from an external power supply unit to the function module. If the control current is supplied via the first switching device 100 associated with the function module 300, the coil terminals A1', A2' of the first switching device 100 can be used for this purpose.

For the case in which the control current is supplied to the function module 300 via the first switching device 100, the function module 300 does not necessarily require a sensor element 320 for detecting the switching state of the first switching device 100. The switching state information can be transmitted directly to the function module 300 via the control current. If the function module 300 draws the control current via an external power supply unit, the switching state of the first switching device 100 needs to be detected by way of a sensor element 320 of the function module 300.

The second control current interface of the function module 300 is used for retransmitting the control current to the connected further function modules or the further coupling modules 400 and therefore to the further switching devices 200. In this case, the modules 300, 400 are connected in series.

Figure 5:
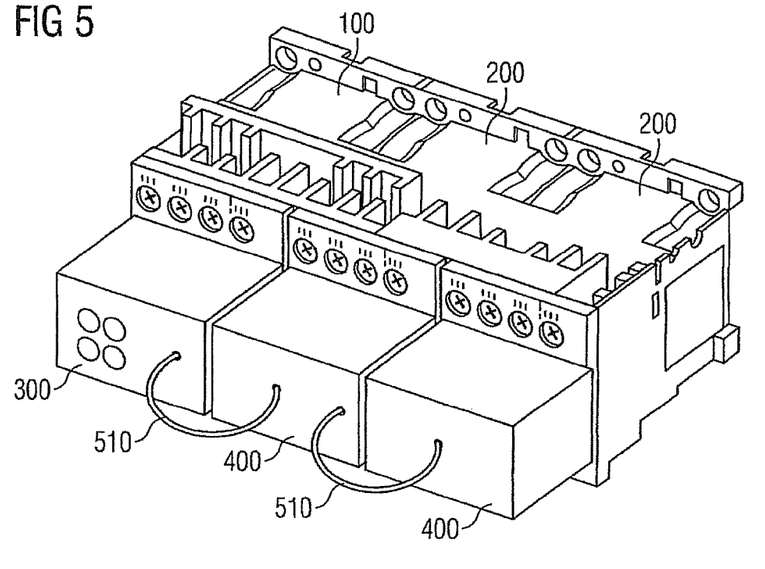
FIG. 5 shows a function module and two coupling modules, each with a switching device.

The connections between the function and coupling modules 300, 400 are realized by suitable connecting lines, as shown in FIG. 5.

The connections are preferably realized by electrical connecting cables, for example by flat ribbon cables 510. Alternatively, the electrical connection can be implemented, for example, by a jumper plug.

In FIG. 5, a function module 300 or a coupling module 400 is plugged onto each of the three contactors 100, 200 of the star-delta combination, i.e. onto the line contactor, the star contactor and the delta contactor, said modules controlling the complete star-delta sequence including interlocking, run-up time and switchover interval. In each case only one connecting cable 510 is provided between the respective modules 300, 400, with both communication and control current supply being realized via said connecting cable.

Figure 6:
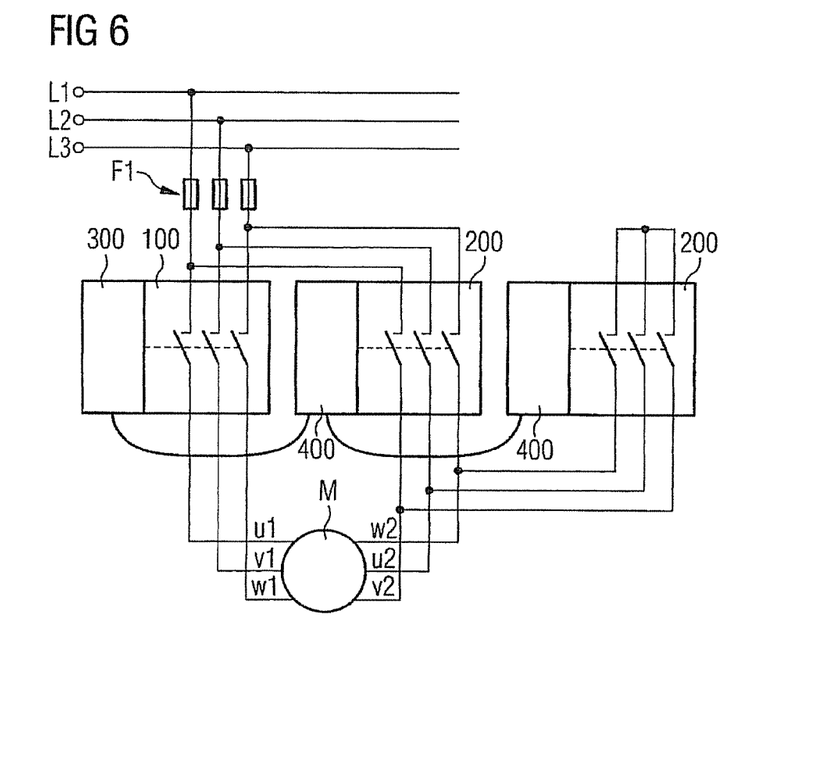
FIG. 6 shows the schematic sketch for a star-delta circuit.

FIG. 6 explains the star-delta circuit shown in FIG. 5. The function module 300 controls the line contactor 100, which is connected to the windings u1, v1, w1 of a three-phase electric motor M. The star contactor 200 and the delta contactor 20 are connected to the windings u2, v2, w2 of the three-phase electric motor M. The function module 300 controls the star contactor or the delta contactor 200 via the coupling modules 400. That is to say that the function module 300 controls the switching state of the line contactor 100 directly or the switching state of the respective contactor 200 associated with a coupling module 400 indirectly via the coupling modules 400. F1 denotes a three-pole motor fuse.

Analogously to this star-delta circuit, further variants of switching device combinations with function modules 300 and coupling modules 400 are possible. It is possible in a particularly simple manner for circuits for starters for motors with a plurality of speeds, Dahlander circuits, reversing contactor circuits, etc. to be realized by means of such a function module 300 and at least one such coupling module 400.

Quick and secure fitting of the system, consisting of at least one function module 300 and at least one coupling module 400, is thus provided at the customer end, with it being possible for this fitting to be performed by untrained personnel. Since the driving of the coupling modules 400 and the supply of power thereto takes place via the connecting line 510 between the function module 300 and a coupling module 400 and amongst the coupling modules 400 themselves, no further control connections to the further switching devices 200 are required. The sequence of the wiring, i.e. the main current circuit and the control current circuit, is as desired on the basis of this type of design of the system for switching device control. By virtue of a suitable circuit of the coupling modules 400, said coupling modules are identical for a star driving or delta driving, and therefore the variance of these coupling modules 400 can be reduced. The modules 300, 400 can be used for different switching device sizes, in particular contactor sizes, by virtue of a suitable mechanical design.

Owing to this design, a wide application in contactor control systems is enabled.

LIST OF REFERENCE SYMBOLS

100 First switching device
200 Second switching device

300 Function module
310 Communication unit
320 Sensor element
340 First electrical circuit
350 Control unit
360 Time-delay switching device
370 Memory module
400 Coupling module
410 Communication unit
420 Sensor element
440 Second electrical circuit
450 Control unit
510 Connecting cable
610 Interrogation wiring
615 Control wiring
620 Auxiliary switch
630 Contactor
660 Timing relay
SK Switching command
AE Transmitted signals
A1,A2 Coil connections
A1',A2' Coil connections
L1,L2,L3 Incoming main current paths
T1, T2, T3 Outgoing main current paths
M Electric motor
u1,v1,w1 Winding connections of electric motor
u1,v1,w1 Winding connections of electric motor
F1 Three-pole fuse Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A function module for switching device control, comprising:
   a communication unit, including a communication interface, to communicate with at least one of at least one further function module and at least one coupling module;
   a control unit, operatively connected to the communication unit, to receive signals transmitted by the at least one of the at least one further function module and at least one coupling module to the communication unit and to transmit switching commands via the communication unit to at least one of the at least one further function module and the at least one coupling module;
   a first control current interface for electrical connection to a first switching device or an external power supply unit; and
   a second control current interface to supply control current to the at least one of the at least one further function module and the at least one coupling module.

2. The function module as claimed in claim 1, wherein the second control current interface is integrated in the communication interface of the communication unit or the communication interface of the communication unit is integrated in the second control current interface.

3. The function module as claimed in claim 2, wherein the function module is connected electrically and mechanically to the first switching device in order to detect the switching state of the first switching device via a sensor element associated with the control unit and in order to transmit switching commands to the first switching device.

4. The function module as claimed in claim 1, wherein the function module is connected electrically and mechanically to the first switching device in order to detect the switching state of the first switching device via a sensor element associated with the control unit and in order to transmit switching commands to the first switching device.

5. The function module as claimed in claim 4, wherein the control unit is designed to use the measured variables detected by the sensor element to determine at least one of the switching state of the first switching device and the switching state of the at least one second switching device, connected electrically to the at least one of the at least one further function module and the at least one coupling module, on the basis of the received signals, the at least one of the at least one further function module and the at least one coupling module including a sensor element to detect the switching state of the at least one second switching device.

6. The function module as claimed in claim 1, wherein the control unit of the function module is designed to actuate a first electrical circuit via a switching command in order to bring about a change in the switching state of the first switching device and to actuate at least one second electrical circuit via at least one switching command in order to bring about a change in the switching state of the at least one second switching device.

7. The function module as claimed in claim 6, wherein the function module or the control unit of the function module includes a time-delay switching device at least one of to transmit a switching command to the first electrical circuit and therefore to the first switching device and in to transmit a switching command to the at least one second electrical circuit and therefore to the at least one second switching device depending on at least one of the detected switching states and at least one input control signal of the first switching device to the at least one of the at least one further function module and the at least one coupling module.

8. The function module as claimed in claim 7, wherein the time-delay switching device is connected to a preprogrammed or preprogrammable circuit diagram in a memory module of the function module or the control unit of the function module to provide the control apparatus with switching states of the individual switching devices which are determined on the basis of the circuit diagram.

9. The function module as claimed in claim 6, wherein the function module is designed to control the switching state of at least one of the first switching device, associated with the function module, the at least one further function module and the switching device associated with the at least one coupling module, via the respective coil terminals thereof.

10. The function module as claimed in claim 1, wherein the function module is fastened detachably on the associated switching device, or is integrated in the associated switching device, so as to produce the at least one of electrical and mechanical connection.

11. The function module as claimed in claim 1, wherein said module includes a device for making contact with the main current paths of the associated switching device, the device for making contact with the main current paths being coupled to the control unit of the function module, with a result that the state of the associated switching device is detectable via a sensor element associated with the control unit, and the detected state of the associated switching device is useable to control a further switching device.

12. The function module as claimed in claim 10, wherein the function module is at least one of snapable and latchable onto said switching device.

13. A system for switching device control, comprising at least one function module as claimed in claim 1 and at least one coupling module, said at least one function module and at least one coupling module being connected to one another via communication units with associated communication interfaces and via control current interfaces for retransmission of a control current.

14. The system for switching device control as claimed in claim 13, wherein the at least one function module and the at least one coupling module are connected to one another by way of a connecting cable.

15. The system for switching device control as claimed in claim 14, wherein the connecting cable includes at least one of a flat ribbon cable and a jumper plug.

16. A coupling module for switching device control, comprising:
   a communication unit; and
   a control unit, operatively connected to the communication unit;
   a sensor element to detect a switching state of a switching device associated with the coupling module being associated with the control unit, the communication unit including a first communication interface to communicate with at least one function module and a second communication interface to communicate with at least one further coupling module and the control unit being designed to transmit the detected switching state of the switching device to the function module or to the at least one further coupling module via the communication unit, wherein an electrical circuit is associated with the control unit, a switching command received via the communication unit is useable to actuate the electrical circuit to bring about a change in the switching state of the switching device, and the coupling module including two control current interfaces.

17. The coupling module as claimed in claim 16, wherein the coupling module is fastened detachably on the associated switching device, or is integrated in the associated switching device, so as to produce at least one of an electrical and mechanical connection.

18. The coupling module as claimed in claim 17, wherein the coupling module is at least one of snapable and latchable onto said switching device.

19. The coupling module as claimed in claim 16, wherein said module includes a device for making contact with the main current paths of the associated switching device, the device for making contact with the main current paths being coupled to the control unit of the coupling module, with a result that the state of the associated switching device is detectable via a sensor element associated with the control unit, and the detected state of the associated switching device is useable to control a further switching device.

20. A system for switching device control, comprising at least one function module and at least one coupling module as claimed in claim 16, said at least one function module and at least one coupling module being connected to one another via communication units with associated communication interfaces and via control current interfaces for retransmission of a control current.

21. The system for switching device control as claimed in claim 20, wherein the at least one function module and the at least one coupling module are connected to one another by way of a connecting cable.

22. The system for switching device control as claimed in claim 21, wherein the connecting cable includes at least one of a flat ribbon cable and a jumper plug.

* * * * *